Oct. 26, 1965  H. KATZ  3,214,625
CERAMIC TUBE WITH SELF-SUPPORTING FRAME GRID ELECTRODE SYSTEM
Filed March 27, 1961  2 Sheets-Sheet 1

Oct. 26, 1965  H. KATZ  3,214,625
CERAMIC TUBE WITH SELF-SUPPORTING FRAME GRID ELECTRODE SYSTEM
Filed March 27, 1961  2 Sheets-Sheet 2

United States Patent Office

3,214,625
Patented Oct. 26, 1965

3,214,625
CERAMIC TUBE WITH SELF-SUPPORTING FRAME GRID ELECTRODE SYSTEM
Helmut Katz, Munich, Germany, assignor to Siemens & Halske Aktiengesellschaft, Berlin and Munich, Germany, a corporation of Germany
Filed Mar. 27, 1961, Ser. No. 98,585
Claims priority, application Germany, May 24, 1960, S 68,645
8 Claims. (Cl. 313—260)

This invention is concerned with a ceramic tube for very high frequencies, especially a tetrode, comprising a ceramic plate for mounting the electrode system which extends in self-supporting fashion therefrom vertically at one side thereof, and a ceramic lead-through member provided with pins for carrying said ceramic plate.

Radio Corporation of America brought out a small tube, referred to as Nuvistor, which had been developed, for example, as a triode, employing the ceramic technique, with coaxially symmetrically arranged electrode structure, entirely avoiding the use of glass and mica. In this known tube, each of the individual electrodes is at its lower end fastened upon a relatively flat slightly conical metal sheet provided with an outer flange which is in turn carried by a so-called tripod. All three metal sheets, in the case of a triode, the sheet for the cathode, the control grid and the anode, are arranged coaxially but in axial direction mutually displaced, each sheet resting with its tripod upon a common ceramic plate and being fastened thereto. One leg of each tripod serves as a lead-in or terminal pin and extends through the ceramic plate, such plate serving in this manner also as lead-through plate.

The use of such known tubes, for operation with very high frequencies, is made quite difficult, primarily owing to the disturbing effect of the considerable capacitances produced by the coaxial arrangement of the metal sheets, and also owing to great difficulties encountered, for example, upon attempting to make the control electrode, which is to be arranged in self-supporting fashion, especially the grid wires, very fine, as it is required, for example, for obtaining great steepness.

The object of the invention is to avoid the above indicated drawbacks experienced in connection with the known electrode arrangement, by employing, for example, at least one frame grid with tensioned wires as a control grid, and by applying other measures, for example, smallest reliably maintained electrode spacing, as well as formation of a very stable and shockproof construction.

This object is achieved, in connection with a ceramic tube for very high frequencies, especially a tetrode, in which the electrode system is held on a ceramic plate, extending in self-supporting fashion vertically from one one side thereof, by constructing, in accordance with the invention, at least one grid electrode of the electrode system as a frame grid with tensioned wires, and by securing the respective mounting parts, frame rods and the like, of the individual electrodes, only in the lower portions thereof, by soldering them in place within metal sleeves which are in turn soldered in place in the ceramic plate.

The various objects and features of the invention will appear from the description which is rendered below with reference to the accompanying schematic drawings, wherein parts which are not absolutely required for an understanding of the invention have been either omitted or left unreferenced.

Figure 1:
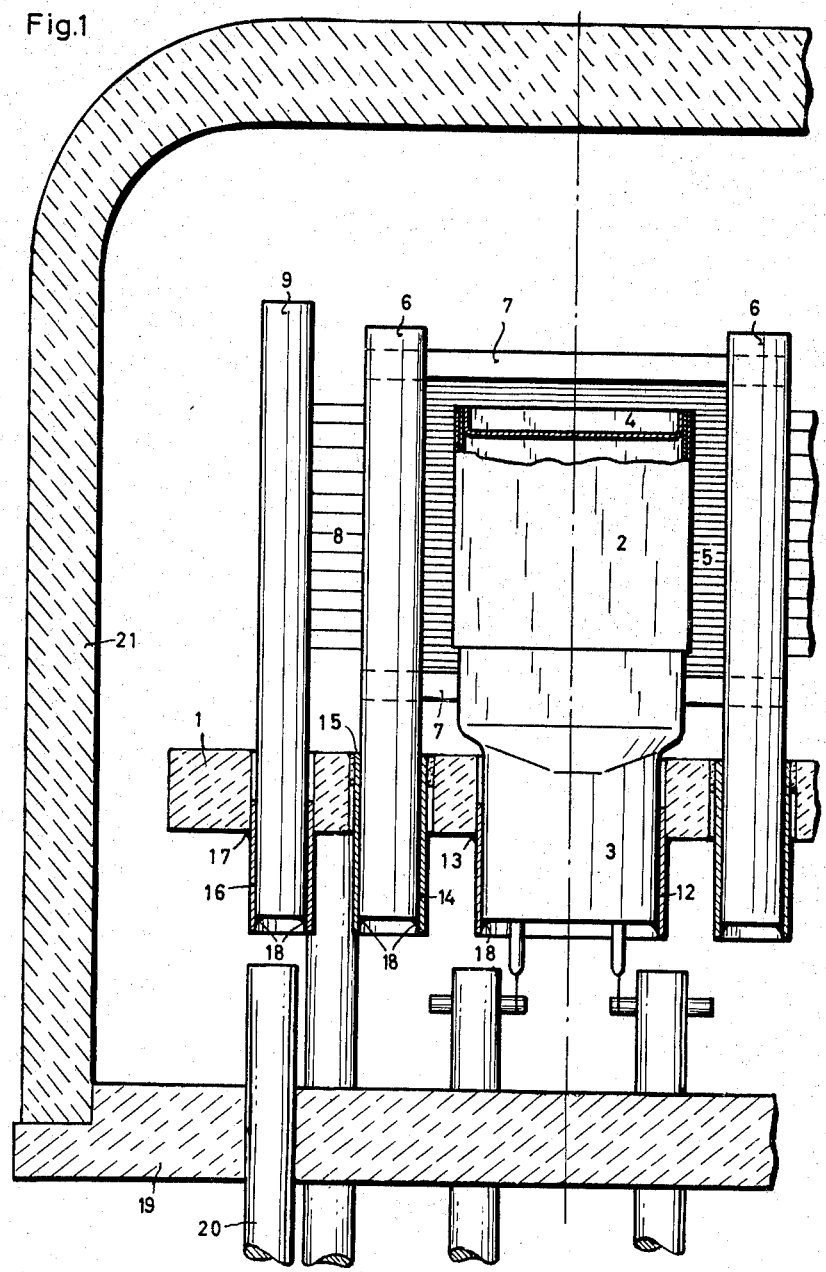
FIG. 1 shows an example of the invention in partial and part sectional view.
Figure 2:
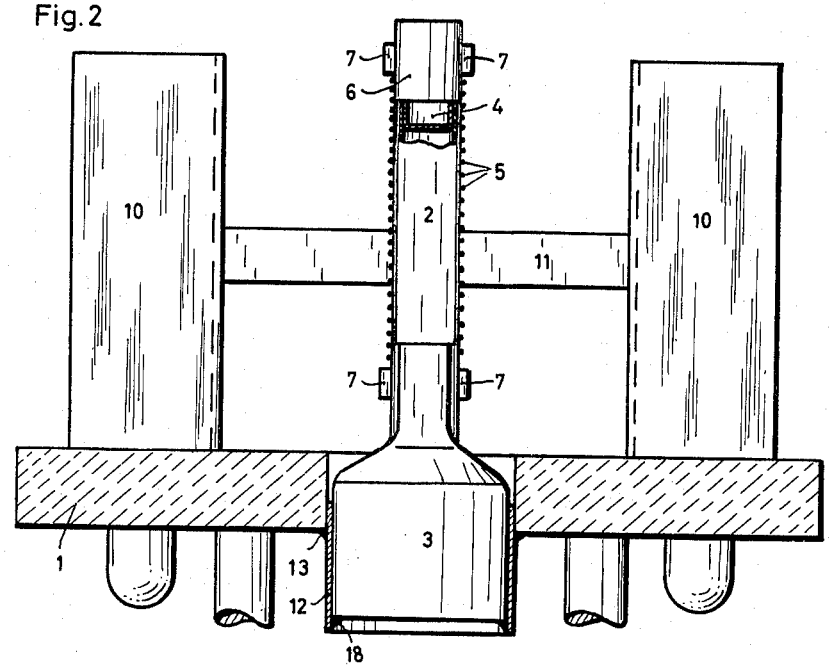
FIG. 2 represents a part sectional side view of the arrangement according to FIG. 1.
Figure 3:
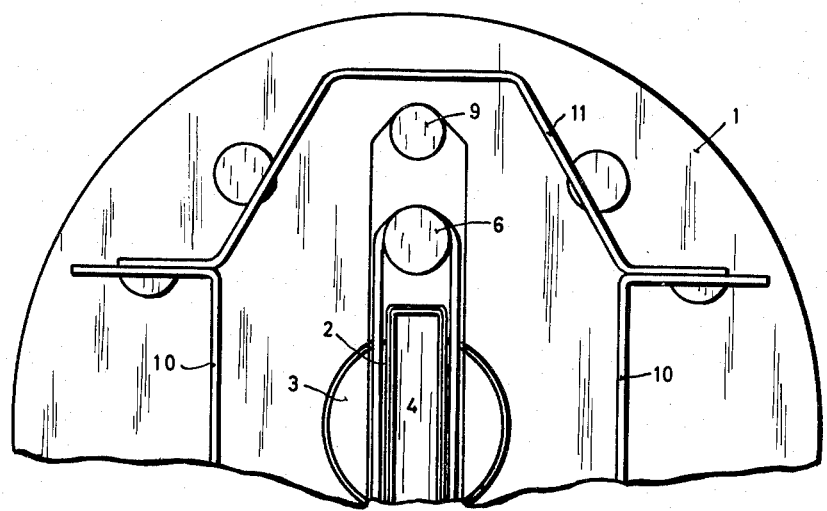
FIG. 3 is a partial elevational top view thereof.

Referring now to the drawings, numeral 1 indicates the ceramic plate to which are fastened the individual electrodes, such as the cathode 2 with its particularly shaped intermediate carrier bushing 3, the control grid 5 with its frame rods 6 and transverse connection 7, the screen grid 8 with its frame rods 9, as well as the anode halves 10 with their transverse connection 11. The mounting parts of the respective electrodes, such as mounting rods and the like, are of circular configuration at least in the lower mounting portions thereof.

Sleeves 12, 14, 16 are provided for securing the various mounting parts, such sleeves being made with close tolerances regarding the inner diameter thereof, and being soldered in place within bores formed in the ceramic plate 1, along areas either in the upper or in the lower part of the bores extending for a distance up to one half of the length of the bores. The bores are for this purpose partially metallized, either on the inside or marginally thereof, so that the soldering can be effected in customary manner. Accordingly, relatively long insulating paths will in each case result over narrow gaps, which cannot be conductively bridged by any vaporizing phenomena from the cathode. For example, the sleeve 16 for mounting the screen grid 8 is soldered at 17 to the lower edge of a bore in the ceramic plate 1, the sleeve extending into the bore only to about one-half of the length thereof, thus resulting in a narrow annular gap which extends over the remaining portion of the bore. The sleeve 14 for mounting the adjacent frame rod 6 of the control grid 5 is however fastened in place by means of an appropriately metallized soldering connection 15, resulting in a downwardly extending annular gap. The metal sleeve 12 for securing the cathode is analogously secured at the lower end of the corresponding bore, as indicated at 13. This sleeve 12 is at its lower end 3 of circular configuration, while conforming at its other end to the profile of the cathode.

Accordingly, the ceramic plate is provided merely with circularly shaped bores into which the respective metal sleeves are with the aid of a gauge inserted and soldered in place.

The metal sleeves project from the ceramic plate 1 at least by an amount corresponding to the thickness of the plate, thereby providing for good stability for the electrode system. The bores for the individual sleeves are provided with relatively great tolerances because any spaces forming incident to the soldering operation, which is effected with the aid of a gauge, will be filled with solder, resulting in defined positions of the sleeves also longitudinally thereof.

The electrode system is assembled with the prepared ceramic plate, with the aid of an assembly gauge, with smallest tolerances, by inserting the various mounting or supporting parts into the respective sleeves disposed in the bores of the ceramic plate. The respective mounting or supporting parts are soldered in place at the lower end thereof, as indicated at 18, by rapid soldering with the aid of a concentrator.

The metal sleeves provided in the ceramic plate are advantageously produced from a material available in trade under the name "Vacon"; however, in the case of particularly high requirements, they may be made of molybdenum.

The heater is finally inserted into the intermediate cathode bushing 3, and the cathode 2 is placed thereon and is if desired provided with an interior cap 4.

The vacuum tight fastening of the bell 21, which may be made of ceramic or metal, upon the ceramic lead-through plate 19, as well as the degasing of the electrodes and evacuation of the tube, are in known manner effected in a receiver without the use of a pump stud.

It is entirely possible to carry out one or the other soldering operation incident to the evacuation and degasing operation.

The tube according to the invention presents aside from the very close tolerances of individual parts that can be realized with precision automats and aside from the high vacuum that can be obtained owing to the ceramic construction, some very important advantages as compared with previously known tubes. Due to the fact that any frame grid electrode system can be used for the tube, for example, also those with a plurality of frame grids, it is possible to produce, as required, tubes with greatest steepness, such as could heretofore be produced only by the use of mica which however requires toleration of drawbacks resulting therefrom. The described construction is moreover adapted to apply the ceramic technique in place of the previously practiced glass tube technique with is proven structure, resulting in slight capacitances as well as retaining the customary and, with respect to exchangeability, practical terminal pin arrangement, thereby additionally obtaining the advantages resulting from a self supporting electrode system without resorting to the use of mica.

The described tube construction is not inherently limited to the example described herein as it can be considerably modified and used in various circumstances.

Changes and modifications are therefore possible within the scope and spirit of the appended claims which define what is believed to be new and desired to have protected by Letters Patent.

I claim:

1. A ceramic tube for very high frequencies, especially a tetrode, comprising an electrode system secured upon and extending in self-supporting fashion from one side of a ceramic plate, at least one grid electrode of said electrode system being constructed as a frame grid with tensioned wires, metal sleeves secured within bores formed in said ceramic plate, certain of said sleeves projecting into the associated bores only for part of the length thereof, with the sleeves of adjacent electrodes having portions disposed at opposite sides of the ceramic plate and soldered in place alternately at opposite ends of the corresponding bores to produce annular spaces extending alternately in opposite directions to the sides of the ceramic plate, and supporting members for the individual electrodes extending into the respective metal sleeves and secured thereto solely in the lower portions thereof.

2. A ceramic tube according to claim 1, wherein said metal sleeves are soldered in position within the respective bores formed in said ceramic plate, said bores being partially metallized to facilitate the soldering thereto of the corresponding electrode supporting members.

3. A ceramic tube according to claim 2, wherein said metal sleeves extend from said ceramic plate on one side thereof for a distance corresponding at least to the thickness of said plate.

4. A ceramic tube according to claim 3, wherein the bores formed in said ceramic plate are of circular configuration.

5. A ceramic tube according to claim 3, comprising a plate having lead-through pins extending therethrough, said ceramic plate being secured to said lead-through pins.

6. A ceramic tube according to claim 3, comprising a cathode having a flat jacket, an intermediate carrier sleeve for said cathode jacket, said carrier sleeve being in its portion facing said jacket of a configuration conforming to the shape thereof and being in its remaining portion of circular configuration for entry into one of the metal sleeves disposed in a bore formed in said ceramic plate to which said circular portion is fastened by soldering.

7. A ceramic tube according to claim 6, comprising an end cap inserted into said cathode jacket at the free end thereof.

8. A ceramic tube according to claim 1, wherein said electrode system is of relatively short structural length, and wherein the supporting parts therefore are of mechanically sufficiently stable construction.

References Cited by the Examiner
UNITED STATES PATENTS

| | | | |
|---|---|---|---|
| 1,281,917 | 10/18 | Eby | 174—152.4 |
| 2,175,707 | 10/39 | Shardlow | 313—260 X |
| 2,695,442 | 11/54 | Klopping | 29—25.16 |
| 2,722,624 | 11/55 | Doolittle | 313—250 |
| 2,754,445 | 7/56 | Sorg | 313—250 |
| 2,935,783 | 5/60 | McCullough | 29—25.16 |
| 3,062,981 | 11/62 | Stoeckert et al. | 313—289 |

DAVID L. GAVIN, *Primary Examiner.*

RALPH G. NILSON, ARTHUR GAUSS, JOHN W. HUCKERT, *Examiners.*